Jan. 19, 1954  H. A. PURSCHE  2,666,376
TRACTOR MOUNTED TWO-WAY PLOW
Original Filed Aug. 14, 1948  4 Sheets-Sheet 1

INVENTOR.
Harry A. Pursche
BY
Lyon & Lyon
ATTORNEYS

Jan. 19, 1954   H. A. PURSCHE   2,666,376
TRACTOR MOUNTED TWO-WAY PLOW
Original Filed Aug. 14, 1948   4 Sheets-Sheet 2
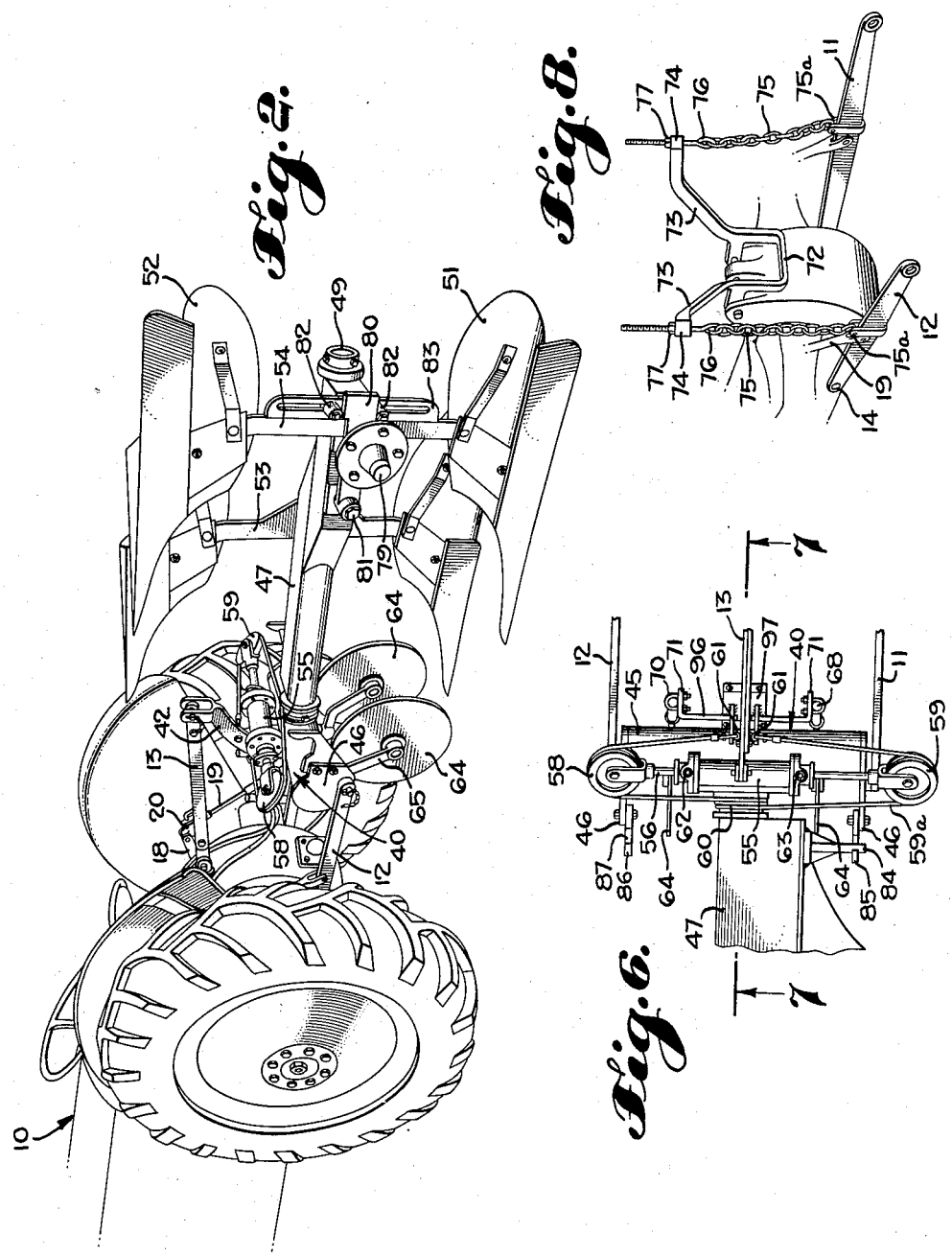
INVENTOR.
Harry A. Pursche
BY
Lyon & Lyon
ATTORNEYS Jan. 19, 1954     H. A. PURSCHE     2,666,376
TRACTOR MOUNTED TWO-WAY PLOW
Original Filed Aug. 14, 1948     4 Sheets-Sheet 3
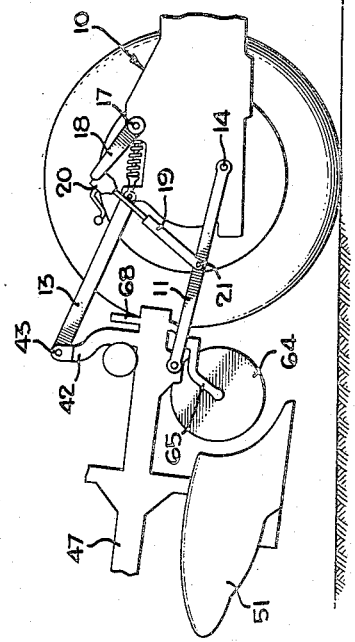
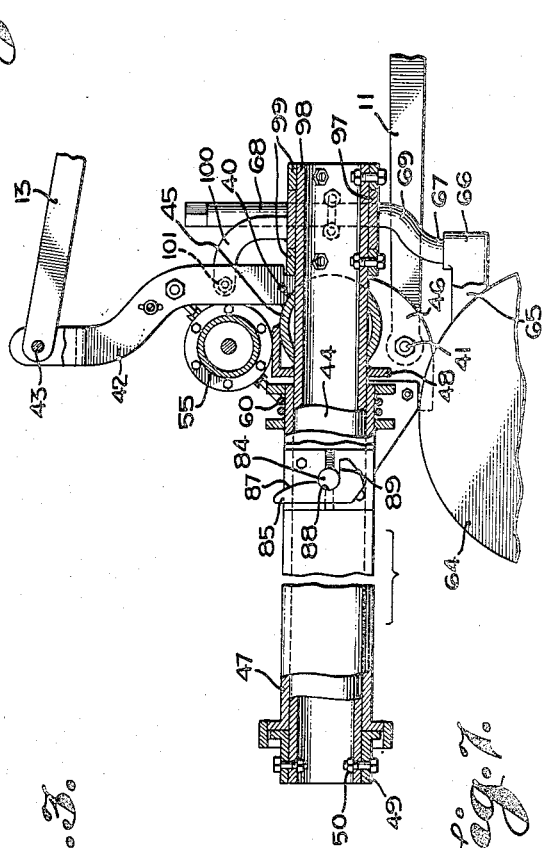
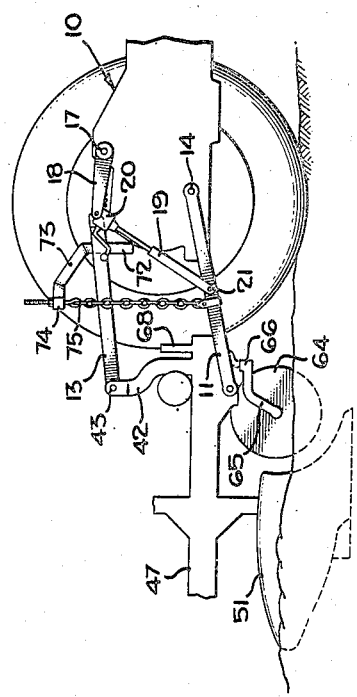
INVENTOR.
Harry A. Pursche
BY
Lyon & Lyon
ATTORNEYS Jan. 19, 1954
H. A. PURSCHE
2,666,376
TRACTOR MOUNTED TWO-WAY PLOW
Original Filed Aug. 14, 1948
4 Sheets-Sheet 4
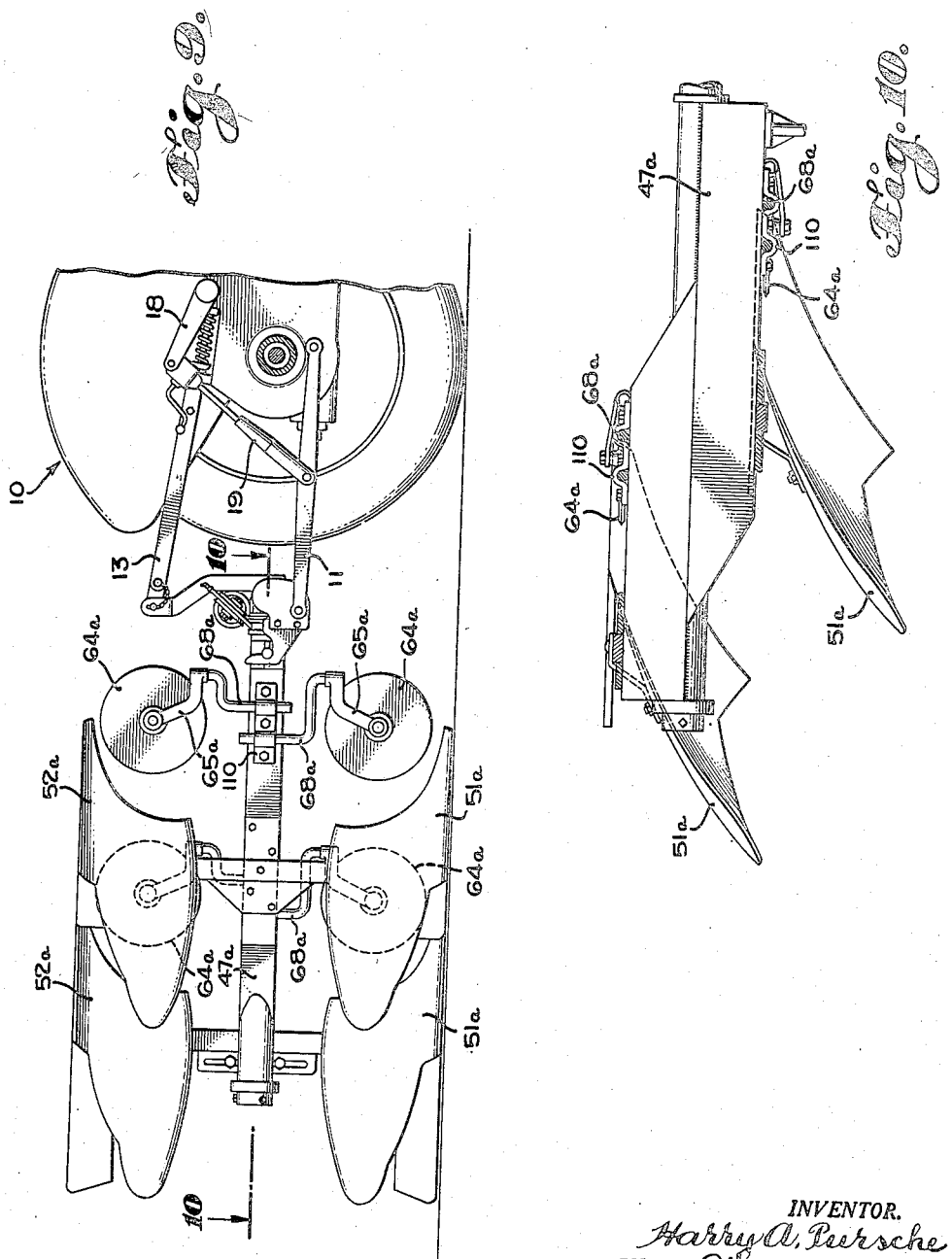
INVENTOR.
Harry A. Pursche
BY
Lyon & Lyon
ATTORNEYS Patented Jan. 19, 1954

2,666,376

UNITED STATES PATENT OFFICE 2,666,376

TRACTOR MOUNTED TWO-WAY PLOW

Harry A. Pursche, Gardena, Calif.

Original application August 14, 1948, Serial No. 44,338. Divided and this application July 25, 1951, Serial No. 238,524

9 Claims. (Cl. 97—26)

1

This invention relates to a tractor mounted two-way plow and is particularly directed to improvements in a two-way plow assembly adapted to be carried on the draft links of a Ford-Ferguson tractor of the general type shown in the Ferguson Patent No. 2,118,181. This invention relates to improvements over the devices shown in my copending applications as follows: Plow, Serial No. 760,846, filed July 14, 1947, Patent 2,625,090; Two-Way Plow, Serial No. 780,417, filed October 17, 1947, Patent 2,625,091; Two-Way Plow, Serial No. 18,252, filed March 31, 1948, Patent 2,625,089; and Two-Way Plow, Serial No. 38,352, filed July 12, 1948.

The present invention is a division of my copending application for Tractor Mounted Two-Way Plow, Serial No. 44,338, filed August 14, 1948, Patent 2,633,786.

The principal object of this invention is to provide a new and improved mounting assembly for a two-way plow so that it may be supported and raised and lowered by means of the rearwardly projecting draft links of a Ford-Ferguson tractor.

Another object is to provide interconnecting hydraulic means between the tractor hydraulic system for raising and lowering the draft links and the hydraulic cylinder on the plow for bringing either a right-hand or a left-hand plow into operative position, whereby the weight of the two-way plow assembly is effective to cause it to be turned through substantially one-half revolution.

Another object is to provide an improved form of automatic latch operable by the drag of a plow in the ground for preventing turning movement of the plow assembly with respect to its supporting frame.

Another object is to provide a tractor mounted two-way plow assembly having a novel form of means for limiting the maximum depth of the plows in the ground.

Another object is to provide a novel form of mounting for coulters which are carried on the plow assembly wherein a coulter is adapted to cooperate with either a right-hand plow or a left-hand plow.

Another object is to provide a mounting for coulters on the rotatable plow assembly so that each plowshare is provided with its own coulter.

Other objects and advantages will appear hereinafter.

In the drawings:

Figure 1 is a side elevation of a preferred embodiment of my invention, one of the rear wheels of the tractor being removed to show the operat-

2 ing parts of the mechanism connecting the plow assembly to the tractor.

Figure 2 is a perspective view thereof, the rear supporting wheel on the plow assembly being omitted.

Figure 4 is a view similar to Figure 3 showing the plow assembly in elevated position.

Figure 5 is a sectional view partly broken away showing details of the hydraulic system on the tractor for raising and lowering the draft links in response to forces exerted by the control.

Figure 6 is a plan view partly broken away of the forward portion of the two-way plow assembly.

Figure 7 is an elevation view partly in section taken substantialy on the lines 7—7 as viewed in Figure 6.

Figure 8 is a perspective detail showing a device for limiting the extent of movement of the draft links in a downward direction.

Figure 9 is a side elevation partly broken away showing a modified form of my invention in which each plowshare is provided with its individual coulter wheel.

Figure 10 is a sectional plan view taken substantially on the lines 10—10 as shown in Figure 9.

Figure 3:
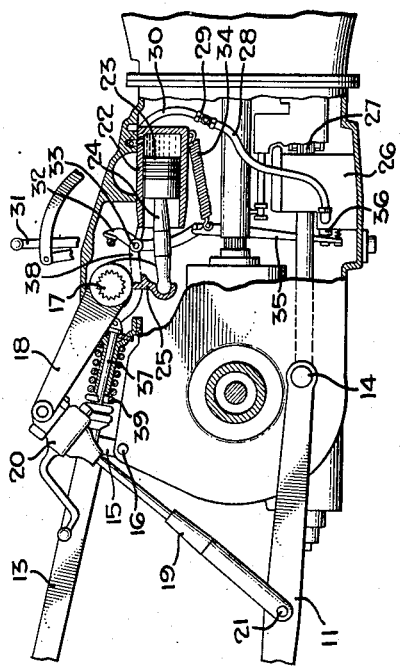
Figure 3 is a view in diagrammatic form illustrating the plow assembly in ground-engaging position.

Referring to the drawings, the tractor 10 is provided with a pair of draft links 11 and 12 and a control link 13. These links are of the type used in the well known Ford-Ferguson system. The links 11 and 12 are each provided with pivot pins 14 connecting their forward ends to the frame of the tractor 10. The control link 13 is connected to a clevis 15 pivotally mounted to the tractor frame at 16. A lift shaft 17 pivotally mounted on the tractor frame is provided with rearwardly extending cranks 18. These cranks 18 are pivotally attached at their outer ends to the pull rods 19. An adjustable device 20 may be mounted on one or both of the pull rods 19 for varying the effective length thereof. The lower end of each of the pull rods 19 is pivotally connected at 21 to one of the draft links 11 or 12 at a location substantially midway between its ends.

Means are provided on the tractor for raising and lowering the draft links 11, and as shown in Figure 5 of the drawings this means includes a hydraulic cylinder 22 having a piston 23 mounted to reciprocate therein. A rod 24 connects the piston to the downwardly extending arm 25 fixed on the lift shaft 17. A fluid pump 26 is driven from a countershaft 27 under power supplied by the tractor engine and serves to deliver hydraulic fluid through the pump discharge line 28 to the "T" fitting 29 and through the cylinder supply line 30 to the interior of the hydraulic cylinder 22. A manually operable valve lever 31 is connected through linkage (not shown) to operate the lever 32 about the movable fulcrum 33 against the action of the coil spring 34. This in turn moves the valve actuating lever 35 to actuate the control valve 36 regulating the discharge of fluid from the pump 26 through the line 28. From this description it will be understood that movement of the manual control lever 31 through an arc in a clockwise direction as viewed in Figure 5 is effective to open the control valve 36 to cause the delivery of pressure fluid to the cylinder 24. This in turn causes the piston 23 and rod 24 to turn the lift shaft 17 and thus to cause the pull rods 19 to raise the draft links 11 and 12.

The Ford-Ferguson hydraulic mechanism on the tractor assembly includes the push rod 37 pivotally connected to the fulcrum member 38. A compression force on the link 13 causes the push rod 37 to move toward the right as viewed in Figure 5 to compress the coil spring 39 and to cause the fulcrum member 38 to move in a direction to open the valve 36. This in turn admits pressure fluid into the lines 28 and 30 to cause the piston 23 to raise the draft links 11. The mechanism described to this point forms a part of the Ford-Ferguson hydraulic system which is well known in the art.

In accordance with my invention, I mount a two-way plow frame, generally designated 40, on the rearwardly extending ends of the draft links 11 and 12. Pivot bolts 41 provide the pivot connection between the frame 10 and the links 11 and 12. A central upstanding post 42 fixed on the frame 40 is pivotally connected at its upper end by means of pivot pin 43 to the rearward end of the control link 13. The frame 40 includes a beam member 44 extending longitudinally in the direction of travel of the plow assembly and having a horizontal crossbar 45 secured at its forward end. The longitudinal beam member 44 is preferably tubular in form and the crossbar 45 may also be tubular if desired. Downwardly extending flanges 46 are secured on the projecting ends of the crossbar 40, and these flanges receive the pivot bolts 41. A carrier 47 is turnably mounted on the longitudinal beam 44 between the stationary abutment 48 and the removable collar 49. The collar 49 is attached to the rear end of the beam member 44 by means of the bolted connections 50. The carrier member 47 is provided with one or more right-hand plows 51 and one or more left-hand plows 52 mounted on opposite ends of standards 53 and 54 removably attached to the carrier 47. These plows may take any conventional form, and while they are illustrated as being of the mold board type it is recognized that other types may also be used.

Means are provided for turning the carrier and plows relative to the longitudinal beam member 44, and as shown in the drawings this means includes the roll-over cylinder assembly 55 mounted on the frame 40 and provided with piston rods 56 and 57 extending from either end. A sheave wheel 58 is rotatably mounted on the piston rod 56 and a similar sheave wheel 59 is rotatably mounted on the piston rod 57. The piston rods 56 and 57 are each connected to a central piston (not shown) reciprocable within the roll-over cylinder assembly 55. A flexible cable 59a makes one or two turns around a drum 60 fixed on the carrier 47 and then extends around the sheaves 58 and 59. The ends of the cable are anchored at a central point with respect to the roll-over cylinder assembly 55, and as shown are secured by fittings 61 to the upright post 42. Suitable hydraulic connections 62 and 63 are provided for admitting hydraulic fluid into opposite ends of the cylinder assembly 55. When hydraulic fluid is admitted into the connection 62 the piston rod 57 is extended and the piston rod 56 is retracted. This causes the cable 59a to turn the drum 60 and carrier 47 to revolve the latter approximately one-half revolution. Similarly, when hydraulic fluid under pressure is admitted into the fitting 63 the piston rod 56 is extended and the rod 57 is retracted, with the result that the cable 59a turns the drum 60 and carrier 47 through approximately one-half revolution in the opposite direction.

Coulters 64 are rotatably mounted at the lower ends of swivel brackets 65. The brackets 65 are each provided with a boss 66 rotatably mounted on the lower end 67 of mounting bars 68. The bars 68 may be offset as shown at 69 to adjust the lateral position of the coulters 64. Suitable clamping means such as for example, U bolts 70, are provided for securing the bars 68 with respect to the forwardly projecting tabs 71 which are fixed on the rocker beam 96. The rocker beam 96 includes a central sleeve 97 rotatably mounted on the forwardly projecting end 98 of the longitudinal beam 44. The movable collars 99 are bolted to the projecting portion 98 and confine the sleeve 97 between them. Curved arms 100 fixed on the sleeve 97 are provided with adjustable stop bolts 101 which are adapted to engage either side of the upstanding post 42 in order to limit the extent of pivotal movement of the rocker beam 96. The coulter wheels 64 are each located to cooperate respectively with one of the left-hand plowshares and one of the right-hand plowshares, depending on which of the shares is located in ground-engaging position. Since the right-hand wheels of the tractor travel in the furrow when the right-hand plowshares 51 are in ground-engaging position, and since the left-hand wheels of the tractor travel in the furrow when the left-hand plowshares 52 are in ground-engaging position, the crossbar 45 does not remain truly horizontal but is inclined slightly whenever the tractor wheels roll in a furrow. This inclination does not affect the action of the coulter wheels, however, since they are mounted on the rocker beam 96 and can thus enter the ground to the same depth regardless of which tractor wheel is rolling in the furrow. The adjustable stop bolts 101 limit the extent of pivotal movement of the rocker beam 96 and thus prevent accidental tilting movement of the rocker beam to an inoperative position.

Figure 1:
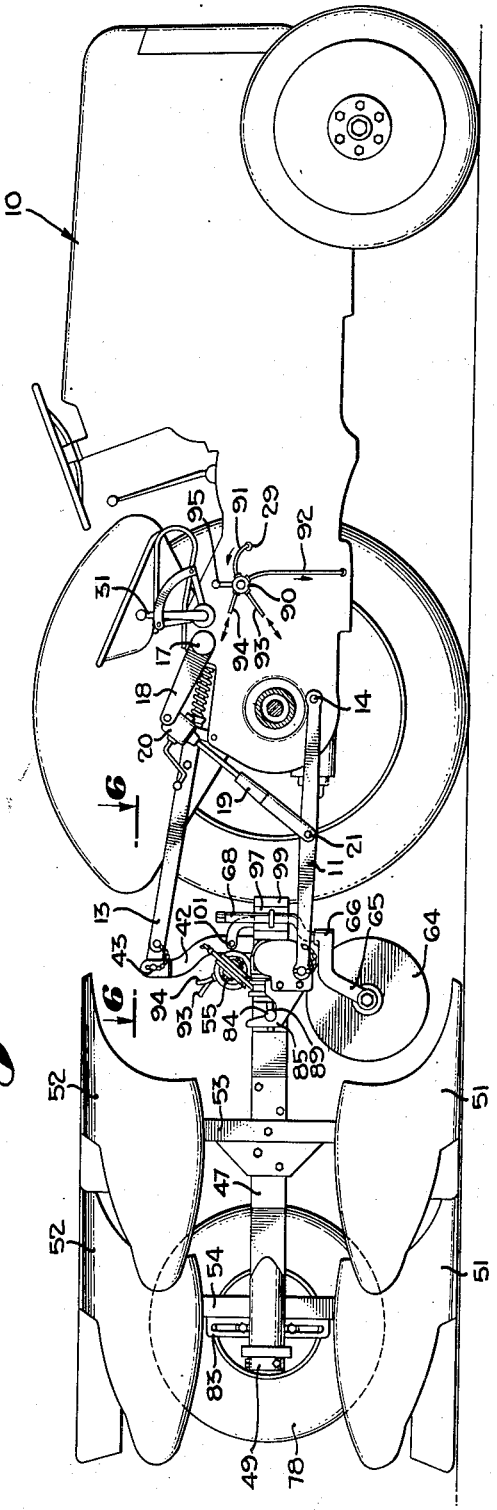

The two-way plow assembly may be raised to an elevated position by raising the draft links 11 and 12. The control link or auxiliary link 13 with its pivotal connection relative to the tractor serves to maintain the post 42 in a substantially upright position, and the weight of the two-way plow assembly is thus transmitted as tension to the control link 13 when the two-way plow assembly is in the elevated position. Figure 4 shows diagrammatically the relative position of the parts when the two-way plow assembly is in such elevated position. When the draft links 11 and 12 are lowered the two-way plow assembly rests on the ground as shown in Figures 1 and 2 or moves downwardly into plowing position upon forward motion of the tractor to assume the plowing position shown in Figure 3.

Means are provided for limiting the downward movement of the draft links 11 and 12 in order to fix the maximum depth of cut of the plowshares. As shown in Figures 3 and 8 this means includes a bracket 72 fixed on the rear portion of the tractor and provided with upwardly extending and diverging arms 73. Each of these arms terminates in an apertured boss 74 positioned substantially above the midpoint of the draft links 11 and 12. A chain 75 is connected at one end to a fitting 75a on its respective link and is connected at its upper end to an eye bolt 76 passing through the boss 74 and maintained against gravity by means of the nut 77. Adjustment of the nut 77 on the eye bolt 76 serves to limit the extent of downward movement of each of the draft links 11 and 12. The bracket 72 and associated chain 75 have been omitted in Figures 1, 2 and 4 for purposes of clarity of illustration.

If desired a tail wheel assembly 78 may be rotatably mounted on an axle 79 carried on the arm 80. The arm 80 is connected to the carrier 47 by means of the pivot bolt 81 and the extent of angular movement of the arm 80 is regulated by means of the adjustable stops 82 on the bracket 83. The tail wheel assembly 78 is adapted to roll on unplowed ground along the edge of the furrow cut by the plows 51 and 52, as is more fully set forth in my prior applications above referred to. The tail wheel assembly has the advantage of accurately controlling the depth of cut of the plowshares 51 or 52, but it has the disadvantage of imposing additional weight on the carrier 47. Furthermore, the weight thus imposed is off-center with respect to the supporting beam 44 and hence unbalances the carrier and plowshares with respect to the rotary movement on the beam 44. Accordingly, the tail wheel assembly 78 may be omitted if desired and the depth of cut of the plowshares 51 and 52 regulated by means of the chains 75.

Latch means are provided for latching the carrier in either one of two positions with the plowshares 51 or 52 in ground-engaging position. As shown in the drawings, this means includes a laterally projecting latching lug 84 fixed on the carrier 47 near the forward end thereof and adapted to engage either one of the latch plates 85, 86 which are attached to the flanges 46 on the frame 40. As shown in Figure 7, the carrier 47 has end play or clearance between the collar 49 and abutment 48 so that it may move axially for a limited distance with respect to the longitudinal beam 44. The latch plates 85 and 86 are each provided with a rounded nose portion 87 for contact with the latching lug 84. When the carrier 47 is in the elevated position rotary movement applied to the carrier by the cable drum 60 causes the carrier 47 to move forwardly against the abutment 48 as it turns by reason of the latching lug 84 moving out of the recess 88 provided in the latch plate. Rotary movement of the carrier is arrested when the latching lug engages the stop surface 89 on the other latch plate. When the plow assembly is lowered into plowing position the drag of the plowshares moves the carrier 47 rearwardly into contact with the end collar 49 and thus moves the latching lug into latching recess 88. So long as the drag of the plowshares continues the carrier 47 is held at its rearward position, thus preventing the latching lug 84 from moving out of the latching recess 88. In this way the drag of the plowshares is utilized to maintain the latching parts in latching position.

As shown in Figure 1 the T fitting 29 is connected to a four-way valve 90 by way of the hydraulic line 91. The valve 90 is also connected by the return conduit 92 to a sump within the tractor housing. The hydraulic lines 93 and 94 are connected to the fittings 62 and 63 on the roll-over cylinder assembly 55. The valve 90 is provided with an actuating handle 95. Movement of the handle 95 to one position connects the pressure line 91 with the hydraulic line 94 and simultaneously connects the hydraulic line 93 with the return line 92. Movement of the handle 95 to another position connects the supply line 91 with the hydraulic line 93 and simultaneously connects the hydraulic line 94 with the return line 92. Accordingly, when the two-way plow assembly is raised to an elevated position the valve handle 95 may be actuated to roll the carrier 47 from one position to the other so long as the pressure is available in the supply line 91.

An important feature of my invention lies in the hydraulic inter-connection of the roll-over cylinder assembly with the hydraulic mechanism built into the tractor for operating the hydraulic lift shaft. Pressure fluid is delivered by supply line 28 connected to the hydraulic pump 26 mounted on the tractor. When the control lever 31 is moved to open the control valve 36, pressure fluid from the pump passes via supply line 30 to the hydraulic cylinder 22, thus causing the piston 23 to move toward the left as viewed in Figure 5 and swing the lift arms 18 in a clockwise direction.

When the plowshares have been lifted clear of the ground surface the control lever 31 may be returned to its neutral position, thereby closing the control valve 36. The weight of the two-way plow assembly applies a counterclockwise torque to the hydraulic lift shaft 17 and thereby pressurizes the fluid within the hydraulic cylinder. This pressure is communicated through the line 30, T fitting 29 and line 91 to the roll-over control valve 90 and to the roll-over cylinder assembly 55. The application of this pressure to the roll-over cylinder assembly causes the carrier 41 to be rotated through approximately one-half revolution. From this description it will be understood that the weight of the two-way plow assembly in elevated position is effective to roll the carrier through approximately one-half revolution. This is a desirable feature, since the volume of oil delivered by the hydraulic pump 26 may be too low when the engine is operating at relatively low speeds to effect a complete roll-over of the carrier 47 during the time interval while the operator is turning the tractor around at the end of the furrow. In operation the tractor is driven to the field to be plowed with the two-way plow assembly held in elevated position, as shown diagrammatically in Figure 4. The control lever 31 is then actuated to relax the pressure in the hydraulic cylinder to permit the two-way plow assembly to descend to the ground under action of gravity. If the tail wheel 78 is employed the adjustable stops 82 on the carrier are set to control the desired depth of cut of the plowshares. If the tail wheel 78 is not employed the nuts 77 on the eye bolt 76 are adjusted to limit the maximum downward movement of the draft links 11 and 12 and thus limit the maximum depth of the plowshares. The tractor is then driven forward under power and the lower plowshares and coulters 64 enter the ground. A furrow is plowed in the usual fashion, and when the far end of the field is reached the operator moves the control lever 31 to raise the plow assembly out of the ground. When the plow assembly reaches an elevated position the operator returns the lever 31 to neutral position and then actuates the control handle 95 on the four-way valve assembly 90. The weight of the two-way plow assembly acting through the linkage upon the hydraulic piston 23 pressurizes the fluid within the hydraulic cylinder 22 and thus provides fluid pressure for actuating the roll-over cylinder 55. Accordingly, the carrier 47 and its plowshares rotate through substantially one-half revolution until the latching lug 84 engages the stop surface 89 on one of the latch plates 85, 86. Rotary movement of the carrier 47 is thus arrested.

This rotary movement of the carrier is accompanied by a slight descent of the two-way plow assembly relative to the tractor, since the hydraulic piston 23 moves in the cylinder 22 in order to cause the roll-over cylinder 55 to complete its stroke. However, the extent of downward movement of the two-way plow assembly is relatively slight and adequate clearance is still present for rotating the plowshares into operative position. The operator then turns the tractor around and returns along the furrow just plowed, using the plowshares which had remained idle on the previous trip across the field. The depth controlling chains and eye bolts 76 have been found to comprise a very valuable feature of my invention, since it enables the operator to maintain a much more uniform depth of furrow than if no depth limiting means were provided. These chains 75 and supporting arms 73 eliminate the undesirable requirement that the operator constantly adjust the valve control lever 31 for maintaining uniform depth of furrow. The carrier 47 is automatically latched in each of its two operative positions by the action of the latching lug 47 and recesses 88 in the latch plates 85 and 86 as described above.

The use of the coulters 64, is, of course, optional and may be omitted if desired. Furthermore, it is contemplated that the two-way plow frame 40, including the longitudinal beam 44 and crossbar 45, may be used independently of the carrier 47 and plowshares 51 and 52 if desired. Removal of the end collar 49 permits the longitudinal beam 44 to be withdrawn forwardly from the carrier 47 and its associated plowshares. This longitudinal beam may be then employed for connection with any other agricultural machinery.

In the modified form of my invention shown in Figures 9 and 10, individual coulter wheels 64a are positioned on the carrier 47a and arranged to cooperate with one of the plowshares 51a or 52a. Each coulter wheel 64a is carried on a swivel bracket 65a attached to one end of an arm 68a adjustably mounted on the carrier 47a. Friction clamps 110 may be used for releasably attaching the arms 68a to the carrier 47a. As shown in Figure 10 the coulters 64a are each positioned substantially in alignment with the point of each of the cooperating plowshares. The construction of the carrier 47a and its manner of support and operation from the tractor 10 are substantially the same as that described in connection with Figures 1 to 8.

Having fully described my invention, it is to be understood that I do not wish to be limited to the details herein set forth, but my invention is of the full scope of the appended claims.

I claim:

1. In a two-way plow assembly, the combination of: a frame having a rearwardly extending longitudinal beam, a carrier turnably mounted on the beam and having limited longitudinal movement thereon, a right-hand plow and a left-hand plow fixed on the carrier, power means on the frame adapted to turn the carrier to bring either of said plows into operative position, and latch means on the carrier and frame adapted to prevent relative turning movement of the carrier and frame, said latch means including an element on the carrier movable into cooperative engagement with a second element on the frame under action of the drag of one of the plows in the ground.

2. In a two-way plow assembly, the combination of: a frame having a rearwardly extending longitudinal beam; a crossbar fixed on the frame at the forward end of said beam, a carrier turnably mounted on the beam and having limited longitudinal movement thereon; a right-hand plow and a left-hand plow fixed on the carrier; power means on the frame adapted to turn the carrier to bring either of said plows into operative position; and latch means on the carrier and crossbar adapted to prevent relative turning movement of the carrier and frame, said latch means including an element on the carrier movable into cooperative engagement with the other element at the ends of the crossbar under action of the drag of one of the plows in the ground.

3. In a two-way plow assembly, the combination of: a frame having a rearwardly extending longitudinal beam; a crossbar fixed on the frame at the forward end of said beam, a carrier turnably mounted on the beam and having limited longitudinal movement thereon; a right-hand plow and a left-hand plow fixed on the carrier; power means on the frame adapted to turn the carrier to bring either of said plows into operative position; and latch means on the carrier and crossbar adapted to prevent relative turning movement of the carrier and frame, said latch means including a laterally projecting latching lug on the carrier adapted to engage either of a pair of latching plates fixed at the ends of the crossbar under action of the drag of one of the plows in the ground.

4. In a two-way plow assembly, the combination of: a frame having a rearwardly extending longitudinal beam; a carrier turnably mounted on the beam and having limited longitudinal movement thereon; a right-hand plow and a left-hand plow fixed on the carrier; power means on the frame adapted to turn the carrier to bring either of said plows into operative position; and latch means on the carrier and frame adapted to prevent relative turning movement of the carrier and frame, said latch means including cooperating elements on the carrier and frame movable into engagement by relative lonitudinal movement of the carrier under action of the drag of either one of the plows in the ground.

5. In a two-way plow assembly, the combination of: a frame having a rearwardly extending longitudinal beam; a carrier turnably mounted on the beam and having limited longitudinal movement thereon; a right-hand plow and a left-hand plow fixed on the carrier; power means on the frame adapted to turn the carrier to bring either of said plows into operative position; and latch means on the carrier and frame adapted to prevent relative turning movement of the carrier and frame, said latch means including an element on the carrier movable into cooperative engagement with a second element on the frame under action of the drag of one of the plows in the ground, the latch elements being shaped to move out of engagement under the turning force exerted by the power means when the plow assembly is raised clear of the ground.

6. A two-way plow assembly for use on a tractor having draft links and means for lifting the draft links, comprising in combination: a frame adapted to be pivotally connected to the draft links and to be raised and tilted thereby, a carrier provided with a right-hand plow and a left-hand plow, means turnably supporting the carrier upon the frame for turning and axial sliding movement about a longitudinal axis, power means for turning the carrier on the frame to bring either plow into operative position, latch means on the carrier and frame adapted to prevent relative turning movement of the carrier and frame, said latch means including latching parts engageable under action of the drag of one of the plows in the ground, the carrier being adapted to slide forward by gravity to disengage the latching parts when the frame is tilted upwardly.

7. A two-way plow assembly for use on a tractor having draft links, and means for lifting the draft links, comprising in combination: a frame adapted to be pivotally connected to the draft links and to be raised and tilted thereby, a carrier provided with a right-hand plow and a left-hand plow, means turnably supporting the carrier upon the frame for turning and axial sliding movement about a longitudinal axis, power means for turning the carrier on the frame to bring either plow into operative position, latch means on the carrier and frame adapted to prevent relative turning movement of the carrier and frame, said latch means including a laterally projecting latching lug fixed on the carrier and adapted to engage either of a pair of laterally spaced latching elements fixed upon the frame under action of the drag of one of the plows in the ground, the carrier being adapted to slide forward by gravity to disengage the latching lug when the frame is tilted upwardly.

8. A two-way plow assembly for use on a tractor having draft links and a control link and means for lifting the draft links, comprising in combination: a frame adapted to be pivotally connected to the draft links and control link and to be raised and tilted thereby, the frame including pivotal connection means for connecting the frame to the draft links and to the control link, a carrier provided with a right-hand plow and a left-hand plow, means turnably supporting the carrier upon the frame for turning and axial sliding movement about a longitudinal axis, power means for turning the carrier on the frame to bring either plow into operative position, and latch means adapted to prevent relative turning movement of the carrier and frame, said latch means including a laterally projecting latching lug on the carrier adapted to engage either of a pair of laterally spaced latching plates fixed to the frame under action of the drag of one of the plows in the ground, the carrier being adapted to slide forward by gravity to disengage the latching lug when the frame is tilted upwardly.

9. A two-way plow assembly for use on a tractor having draft links and a control link, and means for lifting the draft links, comprising in combination: a frame adapted to be pivotally connected to the draft links and control link and to be raised and tilted thereby, the frame including a longitudinal beam member having a horizontal crossbar, means for attaching the draft links to the ends of the crossbar and for attaching the control links to the frame, a carrier turnably mounted on the longitudinal beam member and provided with a right-hand plow and a left-hand plow, power means for turning the carrier on the beam member to bring either plow into operative position, latch means adapted to prevent relative turning movement of the carrier and frame, said latch means including a laterally projecting latching lug on the carrier adapted to engage either of a pair of latching plates fixed at the ends of the crossbar under action of the drag of one of the plows in the ground, the carrier having limited longitudinal movement on the longitudinal beam and being adapted to slide forward by gravity to disengage the latching lug when the longitudinal beam is tilted upwardly.

HARRY A. PURSCHE.

References Cited in the file of this patent

UNITED STATES PATENTS

| Number | Name | Date |
| --- | --- | --- |
| 199,036 | Daniel | Jan. 8, 1878 |
| 204,484 | Daniel | June 4, 1878 |
| 1,021,117 | Van Egeren | Mar. 26, 1912 |
| 1,283,679 | Copeland | Nov. 5, 1918 |
| 1,546,844 | Lee | July 21, 1925 |
| 1,721,456 | Lee | July 16, 1929 |